United States Patent [19]
Umehara et al.

[11] Patent Number: 4,784,541
[45] Date of Patent: Nov. 15, 1988

[54] HIGH-PRECISION EQUIPMENT

[75] Inventors: Toshiyasu Umehara; Ryukichi Tsuno; Tsutomu Miyawaki, all of Nagano, Japan

[73] Assignee: Kabushiki Kaisha Sankyo Seiki Seisakusho, Suwa, Japan

[21] Appl. No.: 40,523

[22] Filed: Apr. 17, 1987

[30] Foreign Application Priority Data

| Apr. 21, 1986 | [JP] | Japan | 61-60429[U] |
| Aug. 11, 1986 | [JP] | Japan | 61-123569[U] |
| Jan. 23, 1987 | [JP] | Japan | 62-8441[U] |
| Feb. 24, 1987 | [JP] | Japan | 62-26252[U] |

[51] Int. Cl.$^4$ ............................................. B23Q 15/24
[52] U.S. Cl. ...................................... 409/186; 408/10; 408/13; 409/193
[58] Field of Search .................. 408/8, 10, 12, 13, 16; 409/186, 193, 180, 201, 208, 147, 149–151, 153, 195, 245, 246; 33/504, 628, 630, 638, 640–642, DIG 1; 83/368, 370

[56] References Cited

U.S. PATENT DOCUMENTS

| 3,605,909 | 9/1971 | Lemelson | 408/8 X |
| 3,963,364 | 6/1976 | Lemelson | 408/16 X |
| 4,118,139 | 10/1978 | Lemelson | 408/12 |

*Primary Examiner*—Gil Weidenfeld
*Assistant Examiner*—Steven C. Bishop
*Attorney, Agent, or Firm*—Flynn, Thiel, Boutell & Tanis

[57] ABSTRACT

A high precision processing equipment includes a contactor provided in a numerical control processing unit and moved in a direction parallel to a spindle, so that the contactor is brought into contact with a workpiece or its support member during feeding motion of the spindle so as to define a positional relationship between the contactor and the spindle. When a magnetic-electric converting element attached to the contactor is opposed to a magnet on the spindle during feeding movement of the spindle, the element detects movement of the magnet, and a resulting detection signal is used to obtain a positional relationship between the spindle and a workpiece, i.e. the starting position of a subsequent processing motion during activation of the processing unit.

14 Claims, 10 Drawing Sheets

HIGH-PRECISION EQUIPMENT

FIELD OF THE INVENTION

This invention relates to a numerical-controlled processing equipment, i.e. a high-precision processing equipment to be used at a station of a transfer machine, and more particularly to means for precisely fixing relative positions of a tool of a spindle and a workpiece.

BACKGROUND OF THE INVENTION

In a transfer machine, a workpiece is supported at a position by a jig or a pallet, and held immoved at every station by them for necessary cutting operation by a processing unit.

In most cases, a processing unit of this type includes a numerical control device to automatically index the position of a tool with respect to a workpiece to effect cutting operation there under a necessary feeding amount (processing depth).

However, thermal deformation often occurs in feed screws, spindle, column or base of the processing unit during working operation. Beside this, there often exist dimensional errors in the jig itself of the transfer machine, positional errors of a workpiece with respect to the jig and cumulative errors among multiple parts or members, and they necessarily invite a positional error between the workpiece and the processing unit.

Therefore, even if the processing unit precisely controls the positions and the feeding amount according to a predetermined numerical control program, the aforegoing thermal deformation and dimensional errors in various parts inevitably invite a working error of the workpiece.

In this connection, the present inventors formerly proposed a technology disclosed in Laying-Open Publication No. 61-16254 of Japanese Utility Model application in which after the positional relationship between a workpiece and a tool of a spindle is indexed by a sensor of the spindle located at a position distant from the workpiece by a predetermined distance, the working depth is numerically controlled.

This proposal certainly ensures a high precision working. However, upon fixing the position of the spindle in its feeding direction, i.e. during a motion of the sensor for detecting a reference position, the spindle is temporarily held in non-feeding condition for the purpose of rotational position indexing. This is a loss time which decreases the processing capacity of the equipment.

OBJECT OF THE INVENTION

It is therefore a first object of the invention to provide a processing equipment which does not require the rotational position fixing function in the spindle feeding process, and which continuously performs the feeding action, the reference position indexing and a subsequent cutting motion to ensure an efficient working operation.

A second object of the invention is to provide a high-precision processing equipment which alleviates the prior art problem by using a contactor for an accurate three-dimentional positional detection and which can detect and correct the position of the tool in the Z direction during processing feeding movement so as to decrease or completely eliminate the detection time.

A third object of the invention is to provide a particular arrangement of X and Y direction detecting means suitable for a high precision processing.

A fourth object of the invention is to provide a high precision processing equipment having improved magnetic shield means for shielding an annular magnet used for detection of the original position of a tool in the Z-axis direction.

A fifth object of the invention is to provide an arrangement which facilitates a high precision working also in the use of a device such as a transfer machine in which high precision processing has not hardly been expected unless some changes are added to the device.

A sixth object of the invention is to provide a high precision processing equipment in which a solid magnet piece is attached to a large-diameter spindle in lieu of an annular magnet so as to facilitate fabrication of the magnet, which enables the use of a magnet having a sufficient strength against a high revolution and readily magnetized by a normal magnetizing device, and which establishes a measuring function and an adjusting function.

SUMMARY OF THE INVENTION

To attain the objects, the invention uses a contactor provided in a numerical-control processing unit and movable in a direction parallel to a spindle. The contactor is configured to contact a workpiece or its support member during feeding movement of the spindle of the processing unit so as to establish a positional relationship between the spindle and the workpiece and locate an annular magnet on the spindle at a position opposed to a magnetic-electric converting element of the contactor during the feeding movement of the spindle. When the annular magnet is opposed to the magnetic-electric converting element of the contactor during the feeding movement, the numerical control device receives an output signal from the magnetic-electric converting element and skips a numerical control program during the feeding movement to undertake a subsequent program, i.e. a feeding movement for a cutting operation.

Since the annular magnet is fixed to the spindle and magnetized in its axial direction, the magnetic-electric converting element can detect movement of the annular magnet even during a rotating, feeding movement of the spindle. Therefore, during a rotating feeding movement of the spindle, i.e. during its processing motion, the positional relationship between the spindle and the workpiece is precisely indexed without stopping the spindle.

DETAILED DESCRIPTION

The invention is described below, referring to some preferred embodiments illustrated in the drawings.

Figure 1:
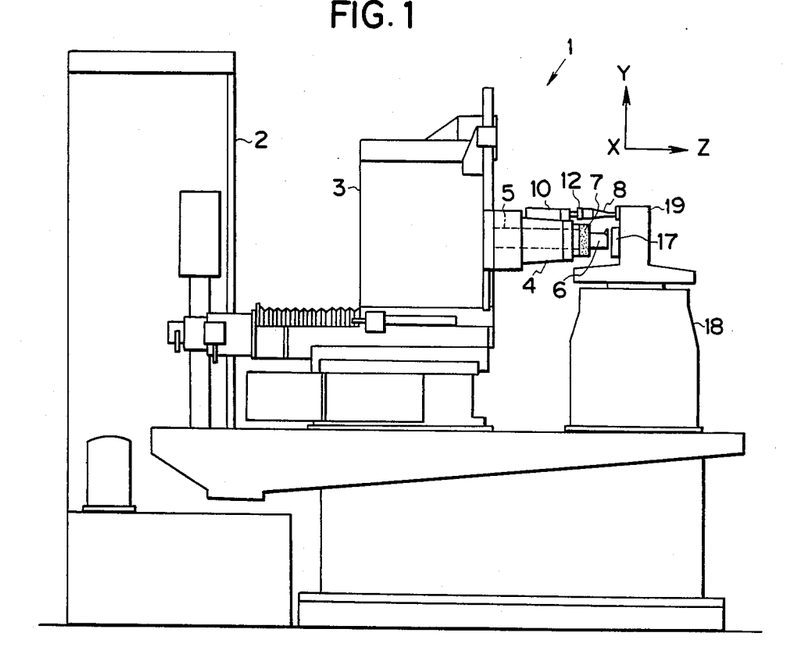
FIG. 1 is a side elevation of a high precision processing unit according to a first embodiment of the invention.
Figure 2:
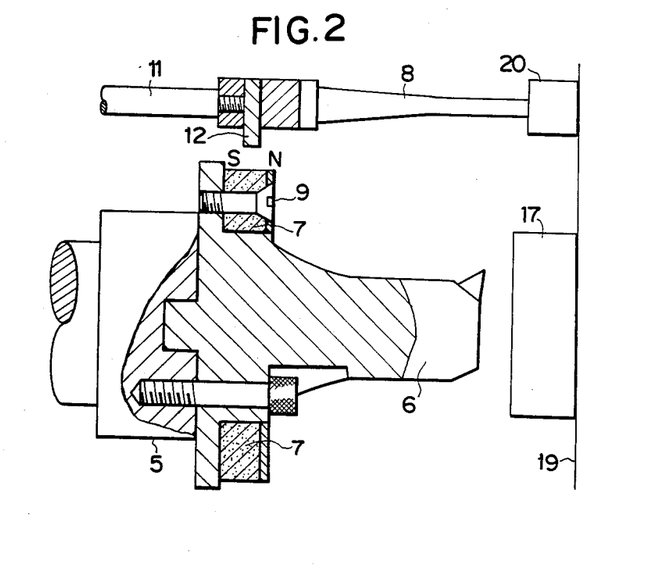
FIG. 2 is a partial side elevation of the unit of FIG. 1 part of which is cross-sectioned.
Figure 3:
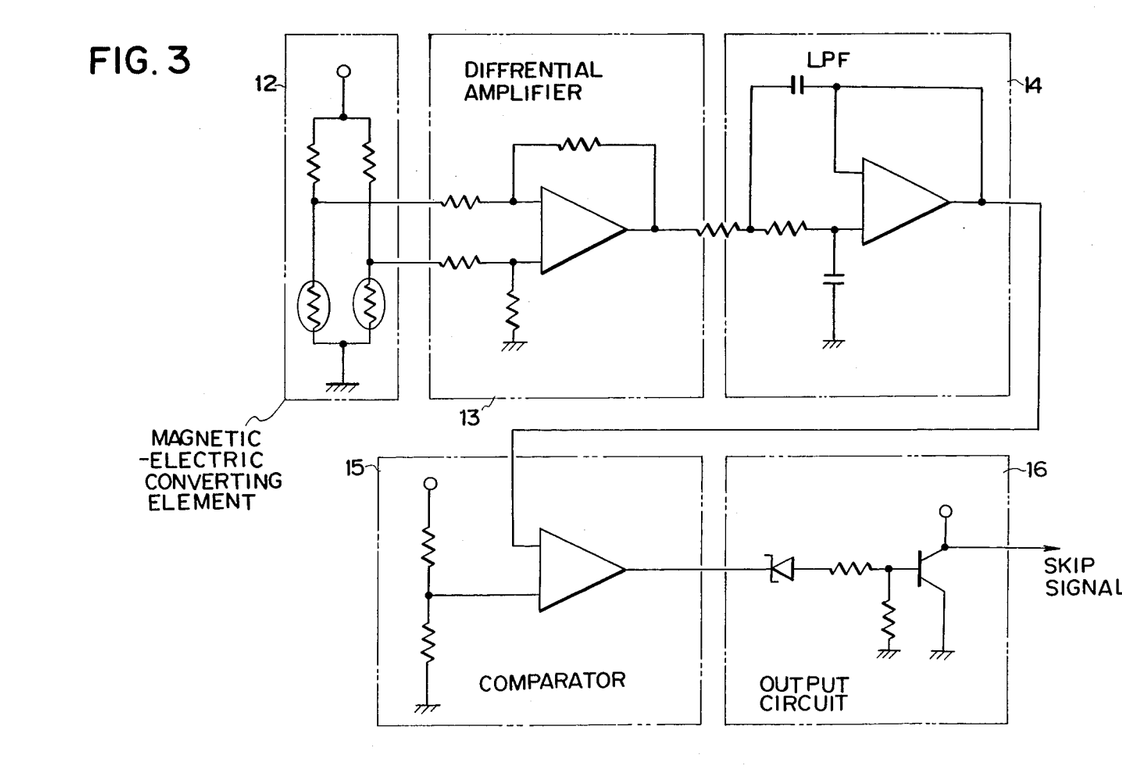
FIG. 3 is a circuit diagram including a magnetic-electric converting element and a skip signal generator.

FIGS. 1 and 2 illustrate a precision processing equipment according to a fist embodiment of the invention. The precision processing equipment 1 includes a processing unit 3 controlled by a numerical control device 2 in a three-dimensional fashion, i.e. in the X, Y and Z directions. The processing unit 3 includes an annular magnet 7 at a position corresponding to an end of a Z-axis spindle 5, e.g. along an outer circumferential member (holder) of a tool 6 attached to the spindle 5. The annular magnet 7 is fixed by bolts 9 concentrically with the spindle 5, and is energized into N and S poles in the same direction, so that a boundary of the magnetic poles on the circumferential surface is used as a detected portion. The processing unit 4 supports a contactor 8 of a predetermined length in parallel with the spindle 5 by a push-and-draw means, e.g. a piston rod 11 of a modest air cylinder 10 attached to a lateral surface of the processing head 4 and using air of about 1 to 2 atmospheric pressure. The piston rod 11 includes a magnetic-electric converting element 12 opposed to the annular magnet 7 at the lateral surface of an intermediate portion of the rod 11. The magnetic-electric converting element 12 is connected in sequence to a differential amplifier 13, low-pass filter 14, comparator 15 and output circuit 16, forming a bridge circuit as shown in FIG. 3.

A workpiece 17 and its support member 19 such as a pallet are transported by a transfer device 18 to a position in front of the processing unit 3, i.e. a working station. In this embodiment, the workpiece 17 is supported by a vertical surface of the support member 19, and a reference block 20 is mounted at a position corresponding to the contactor 8. The front end of the contactor 8 and the surface of the reference block 20 may preferably be hardwearing, using ceramic, hardened steel, super steel, CBN (cubic boron nitride), precious stone (for the end of the contactor 8, for example) or other super hard material.

With this arrangement, working operation of the processing unit 3 is performed according to a numerical control program of the numerical control device 2 as described below.

First of all, the air cylinder 10 is activated, and brings the piston rod 11 ahead to place the front end of the contactor 8 in contact with the surface of the reference block 20.

In this configuration, the processing unit 3 moves ahead for its feeding motion, rotating the spindle 5, to approach the tool 6 to the workpiece 17. The air cylinder 10 is configured to permit withdrawal of the piston rod 10 during the advancing movement of the processing unit 3 so that while the contactor 8 contacts the reference block 20, the spindle can advance.

When the boundary of the magnetic poles of the annular magnet 7 is opposed to the magnetic-electric converting element 12 during the advancing movement i.e. in the region of the processing motion, the differential amplifier 13, low-pass filter 14, comparator 15 and output circuit 16 are activated to generate a skip signal. The low-pass filter 12 is used to absorb the non-linearity or undulating changes at the boundary between the magnetic poles of the annular magnet 7, and thereby uniform the timing for producing skip signals. The skip signal serves as an instruction signal to interrupt the feeding motion step in the numerical control program and then undertake the subsequent cutting motion step precisely regulating a predetermined feeding amount.

In this connection, the numerical control device 2 skips the processing unit 3 to the cutting motion step on receipt of the skip signal, and moves it ahead by a predetermined feeding amount so that the tool 6 performs a cutting operation against the workpiece 17 up to a predetermined depth. The air cylinder 10 automatically retires after generation of the skip signal to a position ready for a next motion.

As a matter of course, the position where the skip signal is produced is measured before the aforegoing working is effected, and the feeding condition for a subsequent actual working operation is determined based on the result of the measurement.

The above-described embodiment is configured to accurately index the feeding direction of the spindle 5, i.e. the Z-axis directions can be detected as disclosed in the aforegoing publication No. 61-6254 of a Japanese utility model application in which a sensor is attached to the front end of the contactor 8 for each X-axis or Y-axis direction so that the position of a detected member of the reference block 20 is indexed by each sensor. Therefore, high precision in the positional fixture is established not only in the Z-axis direction but also in the X- and Y-axis directions.

In the aforegoing embodiment, the contactor 8 is configured to contact the surface of the reference block 20. However, the contactor 8 may be arranged to contact the workpiece 17 or its support member 19. Further, the annular magnet 7 may be directly attached to the end of the spindle 5 instead of the tool 6. The air cylinder 10 for moving the contactor 8 back and forth may be replaced by other cylinder having a locking function or by a combination of a back and forth moving rod and a spring biasing the contactor forward.

Figure 4:
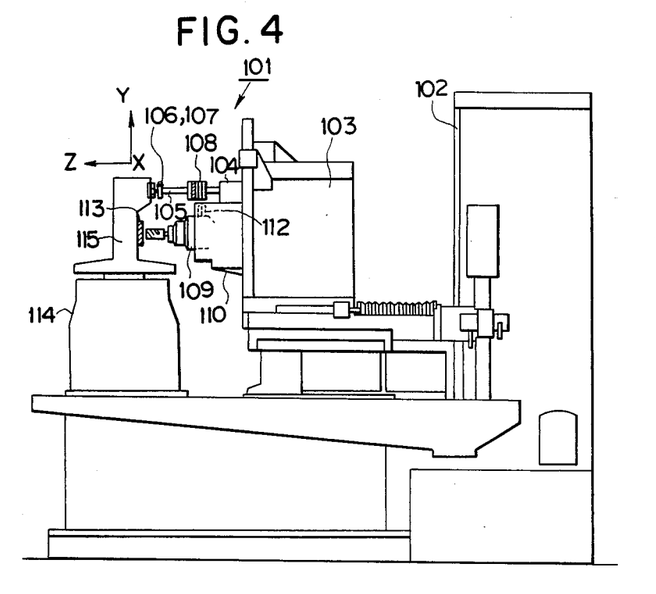
FIG. 4 is a side elevation schematically showing a second embodiment of the invention.
Figure 5:
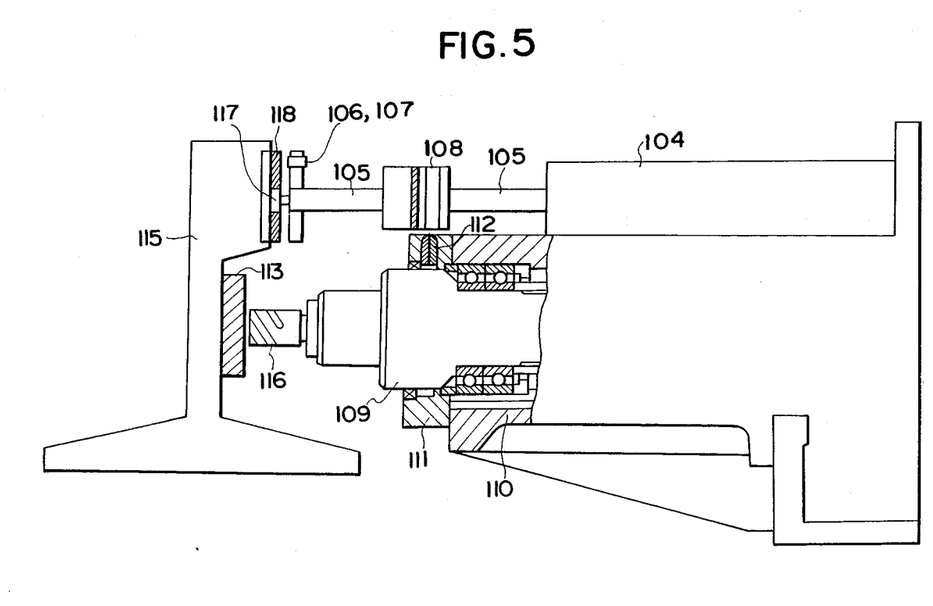
FIG. 5 is an enlarged view of part of the arrangement of FIG. 4.
Figure 6:
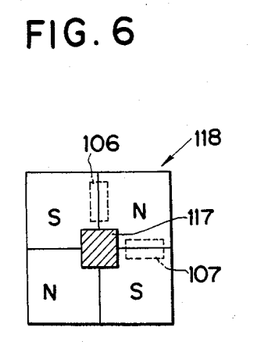
FIGS. 6 and 7 are views of magnet patterns of X and Y magnets in the second embodiment.

FIGS. 4 and 5 show a major part of a precision processing equipment 1 according to a second embodiment of the invention. A processing unit 103 includes a contactor 105 extending in the Z-axis direction and moved in the advancing and withdrawing directions by a special cylinder 104 and a second and third magnetic-electric converting elements 106 and 107 (magnets analogue sensors, for example) provided near a front end of the contactor 105 to serve as X- and Y-direction sensors. The contactor 105 is provided at an intermediate portion thereof with a first magnetic-electric converting element 108 which serves as a Z-direction sensor.

A spindle 109 extending in the Z-direction is supported in parallel with the contactor 105 by a spindle holder 110 to which an annular bearing retainer 111 is fixed. A rod-shaped magnet 112 (second magnet) is fixed to the bearing retainer 111 and provided with N and S magnetic poles in the axial direction of the spindle.

A workpiece 113 and its support member 115 such as a pallet are transported by a transfer device 114 to a position in front of the processing unit 3, i.e. a working station. In this embodiment, the workpiece 113 is supported by a vertical surface of the support member 115, and predetermined working operation is effected against the workpiece 113 by a cutter blade 116 provided at the front end of the spindle.

On the upper surface of the support member 115 is provided an X-Y magnet (first magnet) 118 opposed to a reference surface 117 for contact with the front end of the contactor 105 and to the X- and Y-direction sensors.

The X-Y magnet 118 has a magnet pattern in which the boundary between the N and S poles is horizontal or vertical as shown in FIG. 5, and includes the reference surface 117 at a central portion thereof. When the support member is properly set at the reference positions in the X and Y directions, the X- and Y-direction sensors 106 and 107 are opposed to the boundaries between the N and S poles in the X and Y directions, respectively. The boundaries between the N and S poles are used as original points for a processing program of the numerical control device 102.

In the described arrangement of the precision processing equipment 101, the special cylinder 104 is first activated while the spindle 109 takes its withdrawal position, so as to move the contactor 105 ahead and bring its front end into contact with the reference surface 117. As a result, the X- and Y-direction sensors 106 and 107 are closely opposed to the boundaries between the N and S poles of the X-Y magnet 118. However, if they deviate from the boundaries due to any relative displacement or any cumulative error, the sensors produce analog outputs corresponding to the deviations from the boundaries and supply them to the numerical control device 102. More specifically, analogue signals corresponding to the deviation from the boundaries are converted to digital signals and applied to the numerical control device. The numerical control device which originally stores a relationship between a deviation and a digital value automatically amends the program by an amount corresponding to the deviation.

Concurrently, the processing unit 103 moves ahead for its feeding motion, rotating the spindle 5, to approach the cutter blade 116 to the workpiece 113.

During the advancing movement, i.e. in the region of the processing motion, the Z-direction sensor 108, which is held immovably while the contactor 105 contacts the reference surface 117, is opposed to a second magnet 112 to detect the interpole boundary and apply a resulting detection signal to the numerical control device 102.

The numerical control device 102 amends the program by an amount corresponding to the deviation in the X and Y direction, energizes X-axis and Y-axis servo motors (not shown) and starts the program (as a starting point of a predetermined working operation) in response to the detection signal from the Z-direction sensor. In this fashion, the processing unit 103 advances by a predetermined feeding amount and the cutter blade 116 performs a cutting operation against the workpiece 113 up to a predetermined depth.

Positional detection in the X and Y directions is not limited to the aforegoing method where the amount of deviation is detected from the detection values in the X and Y directions, but may be performed by another method in which X-axis and Y-axis servo motors are activated to completely oppose the X- and Y-direction sensors to the interpole boundaries of the first magnet so as to amend the X-axis position and Y-axis position according to the detection value.

Figure 7:
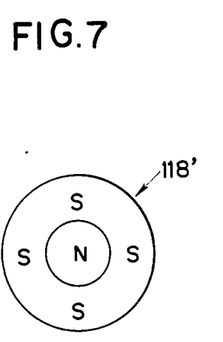

Further, the X-Y magnet pattern of the first magnet may be arranged as shown in FIG. 7.

In the aforegoing second embodiment, the interpole boundaries of the X-Y magnet 118 are curved in the air, and errors often occur in the detecting positions (actual tracing position of the sensors). Therefore, a significantly large detection error is sometimes invited. To overcome the problem, the following arrangement is proposed for the X-Y magnet 118 which forms the X-direction and Y-direction positional detecting means.

Figure 8A:
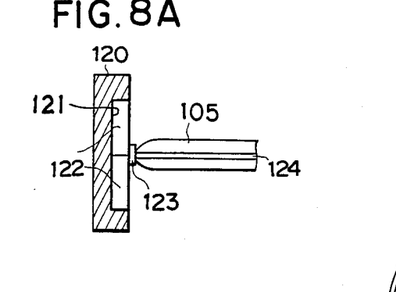
FIG. 8 is a schematic view of a modification of the second embodiment of the invention.
Figure 8B:
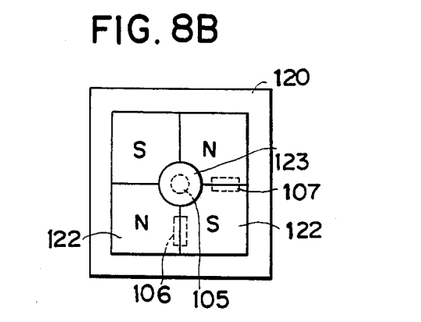

As shown in FIG. 8, a magnetized member (yoke) 120 is used to define a recessed plane 121 to which four rectangular plate magnet members 122 are attached so that their different poles abut each other. At the center of the magnet members 122 is attached a flat, disk-shaped reference member 123 (made from ceramics or other non-magnetic material) which is about 1 mm thick. The recessed plane and the reference member plane (reference surface) coincide with the X-Y planes.

Next, a contactor 105 is made from zirconia or other non-magnetic material and opposed to the reference member 123. The contactor 105 is provided with an axial hole 124 extending along the axial center line thereof, for example, to eject air through the hole in its dormant condition for the purpose of cleaning. X-direction and Y-direction sensors 106 and 107 attached to the contactor 105 by 90 degrees difference are configured to move with the advancing movement of the contactor to positions beside intermediate portions of corresponding interpole boundaries, e.g. positions 200 to 300 μm distant from the X-direction boundary and the Y-direction boundary. The aforegoing intermediate portion may preferably be a portion excluding 30% of the length at each end of the interpole boundaries.

Correction of a detected error (deviation amount) of the above-described arrangement of the X- and Y- direction positional detection means is effected in the following steps which are basically identical to the aforegoing correction method.

(i) The contactor 105 is moved ahead until its contact portion contacts the reference surface of the reference member 123. (Therefore, the reference member 123 may be large enough to cover the maximum error of a machine. For example, in a numerical control machine tool, the diameter is about 200 μm which is about 1 mm larger than the front end diameter of the contactor 105.)

(ii) The processing unit 103 is moved back by 0.1 to 0.2 mm approximately and stopped there. After this, the processing unit 103 is moved in the X direction by about 300 to 500 μm. The position where the X-direction sensor produces its output is used as the X-directional starting point of the processing program.

(iii) Subsequently, the processing unit 103 is moved in the Y direction by about 300 to 500 μm, and the Y-directional starting point of the processing program is determined in the same fashion.

Figure 9:
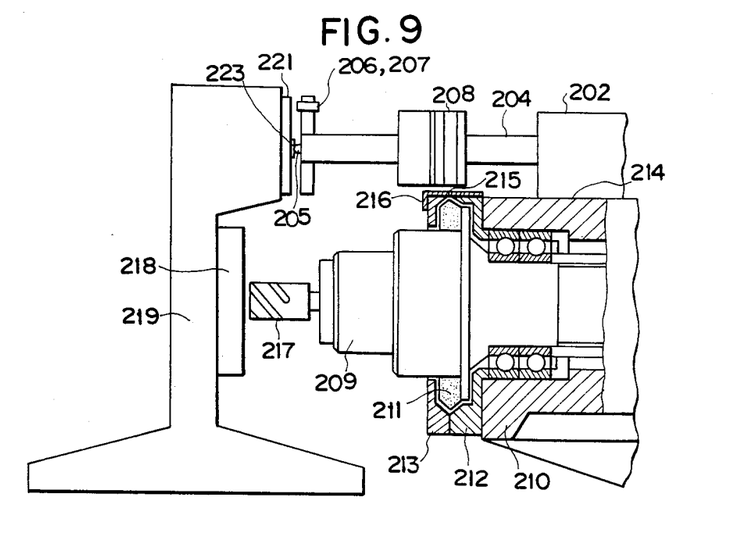
FIG. 9 is an enlarged side elevation of a specific arrangement of a third embodiment of the invention part of which is vertically cross-sectioned at the center thereof.
Figure 10:
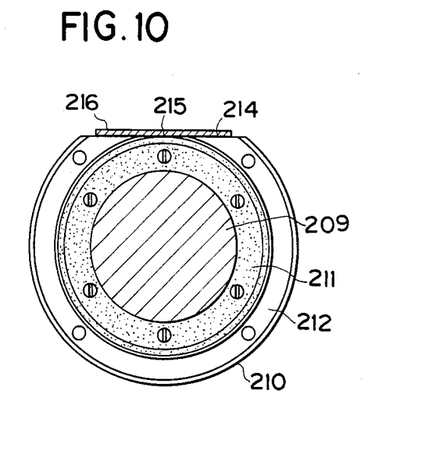
FIG. 10 is a central, vertical cross-sectioned enlarged front elevation of part of FIG. 9 including an annular magnet.

FIGS. 9 and 10 illustrate a third embodiment of the invention. Near a contact portion 205 of a contactor 204 are mounted first and second magnetic-electric converting elements 206 and 207 which are employed as X-axis and Y-axis sensors. The contactor 204 is provided at its intermediate lateral portion thereof with a third magnetic-electric converting element 208 which is employed as a Z-axis sensor.

A spindle 209 extending parallely to the contactor 204 is supported on a front face of a processing unit 202 by a spindle holder 210. Just in front of the spindle holder 210 of the spindle 209 is mounted a plastic annular magnet 211 which is located at the lateral side of the movable region of the third magnetic-electric converting element 208 and has opposite magnetic poles aligned in the axial direction. The annular magnet 211 is magnetically shielded by an annular bearing retainer 212 and a cover 213 which are made from a magnetic material and fixed in front of the spindle holder 210 so as to encircle the annular magnet 211 by a distance.

Upper portions of the spindle holder 210, bearing retainer 212 and cover 213 are cut to form an amount of planar cut surface 214 which is provided at the center thereof with a window 215 to expose part of the annular magnet 211 therethrough. The cut surface 214 is protected against dust by a non-magnetic cover 216. Reference numeral 217 denotes a tool.

A workpiece 218 is put on a support member 219 such as a pallet, and transported by a transfer device 220 to the position in front of the processing unit 202, i.e. to the processing station.

The third embodiment of the precision processing equipment operates identically to the second embodiment, and its explanation is omitted here.

Figure 11A:
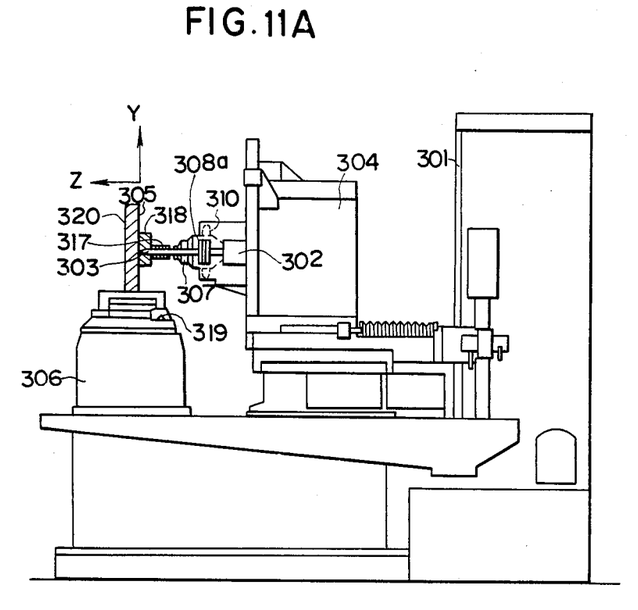
FIG. 11 shows a general construction of a fourth embodiment of the invention by a side elevation at (a) and a plan view at (b)
Figure 11B:
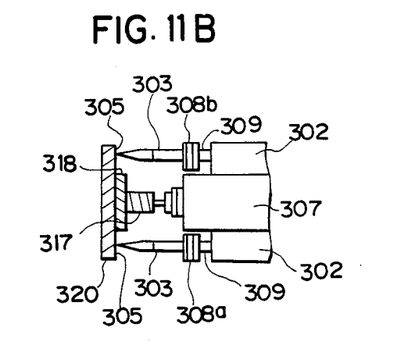

FIG. 11 illustrates at (a) and (b) a fourth embodiment of the invention. A processing unit 304 controlled by a numerical control device 301 in X, Y and Z directions is provided with a spindle 307 rotatably mounted on the front face thereof and with two independent cylinders 302 facing frontward (to the right in the drawings). Contactors 303 movable back and forth in two-axis directions are provided integrally with pistons 309 of the cylinders 302 and extend at both side of and parallel to the spindle 307. At an intermediate portion of each contactor 303 is mounted a magnetic-electric converting element 308a (308b) used as a Z-axis sensor. An annular magnet 310 is mounted on the spindle 307 in a fashion shown in FIG. 12, for example. The cylinder 302 has an arrangement capable of stopping (locking) the pistons 309.

Figure 12:
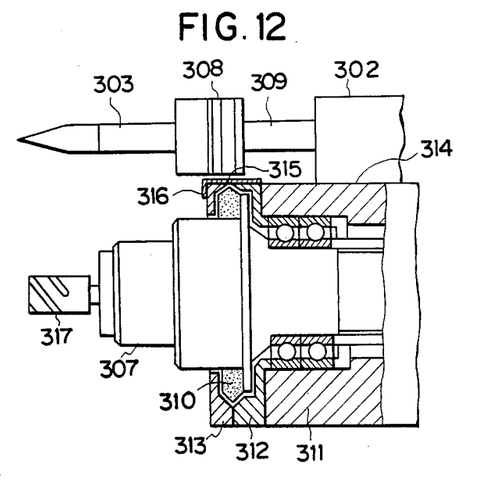
FIG. 12 is a partly enlarged, cross-sectional view of the arrangement of FIG. 11, taken along a line rotated by 90 degrees.

Referring to FIG. 12, the annular magnet 310 is mounted just before the spindle holder 311 of the spindle 307. The annular magnet 310 is close to a lateral side of the moving region of the magnetic-electric converting elements 308a and 308b, and its both magnetic poles are aligned in the axial direction. The magnet 310 is magnetically shielded by an annular bearing retainer 312 and a cover 13 which are made from a magnetic material and secured to the front face of the spindle holder 311 so as to encircle the magnet 310 by a distance.

Upper portions of the spindle holder 311, bearing retainer 312 and cover 313 are cut to form an amount of planar cut surface 314 which is provided at the center thereof with a window 315 to expose part of the annular magnet 310 therethrough. The cut surface 314 is protected against dust by a non-magnetic cover 316. Reference numeral 317 denotes a cutter blade.

A workpiece 318 is affixed to a jig on a pallet 319, and transported by a transfer device (not shown) to a position on an index table 306 in front of the processing unit 304. The index table 306 may be of a known type having a high resolving power and capable of effecting rotation indexing on a horizontal plane, in which normal indexing is controlled by a semi-closed loop or an open loop.

The jig 320 has a parallel degree reference surface 305 to which the contactor 303 contacts prior to a working operation as will be described later. On the index table 306 is provided a positioning pin 319 used to define the position of the pallet 321.

The above-described arrangement of precision processing equipment operates as described below.

(i) The jig 320 and the pallet 319 united together are transported by the transfer device at every station interval and clamped on the index table 306 by engagement with the positioning pin 319.

(ii) The special cylinder 302 is activated, and the processing unit 304 is moved ahead to bring the contactor 303 into contact with the reference surface 305 of the jig 320. During the advancing movement of the processing unit 304, the magnetic-electric converting elements 308a and 308b detect the interpole boundaries of the annular magnet 310 and produce zero outputs.

(iii) In this case, the processing unit 304 is moved ahead until one of the magnetic-electric converting elements 308a and 308b of the cylinders 302 produces a zero output. If the reference surface 305 is angled with respect to the processing unit 304, one of the magnetic-electric converting elements 308a and 308b produces its output earlier than the other. More specifically, when the magnetic-electric converting element 308a produces its output earlier, the index table 306 is rotated to the left, whereas when the element 308b produces its output earlier, the index table 306 is rotated to the right. In this fashion, the position of the workpiece 318 is controlled so that both magnetic-electric converting elements produce zero outputs. As a result, the reference surface 305 is set in parallel with the X direction of the processing unit 304.

(iv) The position of the index table 306 at this time is detected and sent to the numerical control device which responsively adopts the position as the starting point of the processing program.

(v) The cylinders 302 are moved back.

(vi) Predetermined working operation is commenced.

Figure 13:
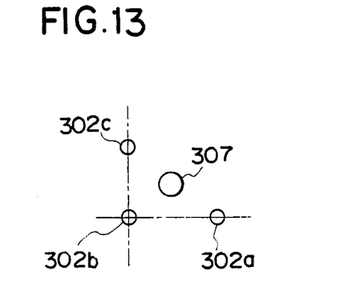
FIG. 13 is a view partly showing a modification of the embodiment of FIG. 11.

In case where detection is required both in the X direction and in the Y direction, one of the cylinders 302 is moved back whereas the other is locked. In this configuration, the processing unit 304 is moved back by 1 to 2 mm to scan in the X and Y directions, for example. Transfer machines in general can mechanically ensure the accuracy in the vertical degree but not in the parallel degree. This is the reason why the aforegoing embodiment is configured to measure the parallel degree (right angle degree between the workpiece and the cutter blade). However, if the vertical degree (inclination) must be also measured, an arrangement shown in FIG. 13 is recommended where three cylinders 302a through 302c are provided in parallel with the spindle 307, and each cylinder is provided with the magnetic-electric converting element whereas means of adjusting the parallel degree and the vertical degree such as an index table is provided in the side of a workpiece.

Figure 14:
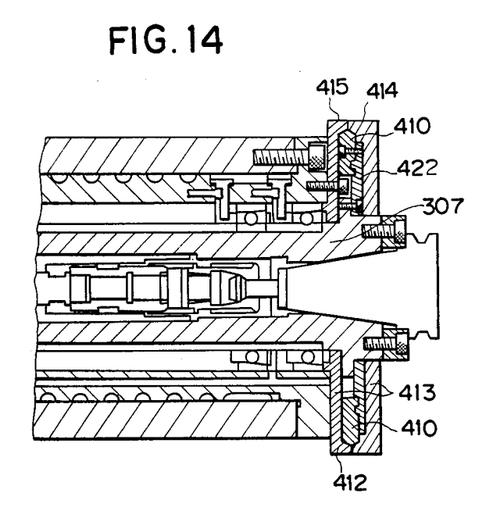
FIG. 14 is a detailed cross-sectional view of a specific arrangement according to a fifth embodiment of the invention.

FIGS. 14 through 19 illustrate a fifth embodiment of the invention in which the annular magnet used in the fourth embodiment is replaced by two magnet pieces 410 (plastic magnets, for example) mounted as shown in FIG. 14.

Figure 15A:
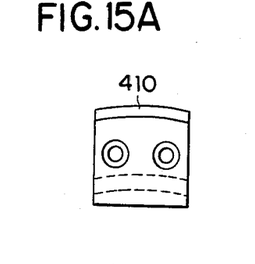
FIG. 15 is a view showing a magnet used in the embodiment of FIG. 14.
Figure 15B:
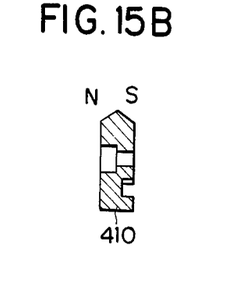
Figure 16A:
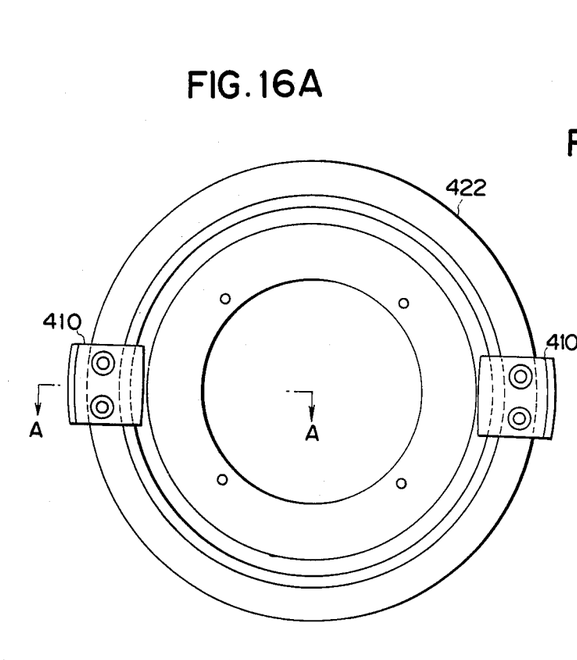
FIG. 16 is a view showing the magnet and a flange united together.
Figure 16B:
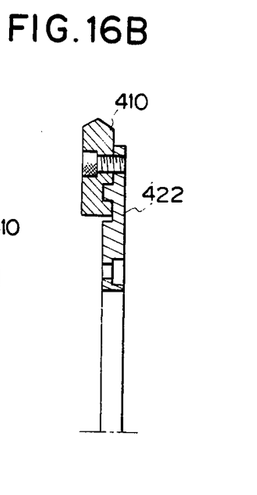

Referring to FIG. 14, just before a spindle holder 411 around the spindle 307 are provided two magnet pieces 410 shown in FIG. 15 at (a) and (b) via a flange 422 as shown in FIG. 16. Each magnet 410 is located along the moving range of the magnetic-electric converting elements 308, and its magnetic poles are aligned in the axial direction. The magnets 410 are magnetically shielded by an annular bearing retainer 412 and a shield case 413 which are made from a magnetic material and secured to the front face of the spindle holder 411 so as to encircle the magnets 410 by a distance.

Upper portions of the spindle holder 411, bearing retainer 412 and shield case 413 are cut to form an amount of planar cut surface 414 which is provided at the center thereof with a window 415 to expose part of the magnets 410 therethrough. The cut surface 414 is provided at two positions by 180 degrees interval.

The above-described arrangement of precision processing equipment operates as follows.

(i) The jig 320 and the pallet 319 united together are transported by the transfer device at every station interval and clamped on the index table 306 by engagement with the positioning pin 319.

Figure 17:
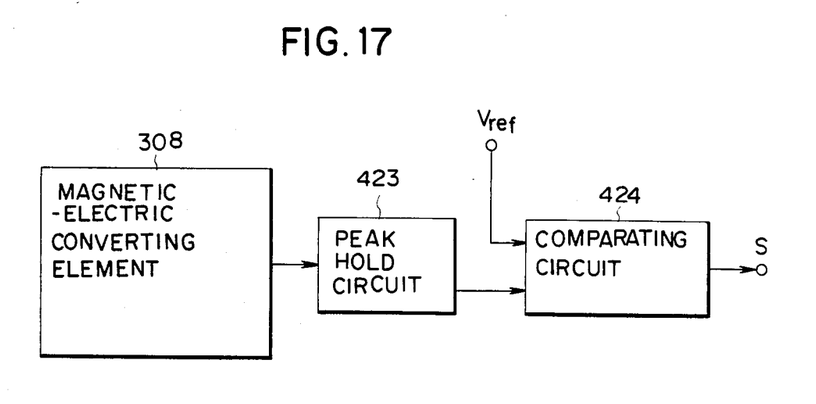
FIG. 17 is a block diagram of a detection output processing system in the embodiment of FIG. 14.

(ii) The cylinder 302 is activated, and the processing unit 304 is moved ahead while rotating the spindle to bring the contactor 303 into contact with the reference surface 305 of the jig 320. During a subsequent advancing movement of the processing unit 304, the magnetic-electric converting element 308 is opposed to the magnet 410 and produces a detection output. Since the detection output is intermittent, the conventional signal processing method cannot be used. In this connection, the invention employs a unique method. That is, only when the rotational angular positions of the magnetic-electric converting element 308 and magnet 410 completely coincide, i.e. only when they are opposed so that the largest output is produced, the detection output is extracted. Subsequently, when the output represents a constant value, for the purpose of obtaining a skip signal S, an output of the magnetic-electric converting element 308 is applied to a peak hold circuit 423, for example, as shown in FIG. 17. A peak hold value from the circuit 423 is compared to a predetermined value Vref by a comparator circuit 424, so that when it is judged to be identical to the aforegoing constant value, a skip signal S is outputted. The signal S is used to change the feeding motion of the processing unit to its program motion (numerical control feeding).

(iii) In this case, the processing unit 304 is moved ahead until one of the magnetic-electric converting elements 308 of the cylinders 302 produces an output (skip signal S). If the reference surface 305 is angled with respect to the processing unit 304, one of the elements 308 produces its output earlier. More specifically, when the magnetic-electric converting element 308a produces its output earlier, the index table 306 is rotated to the left, whereas when the element 308b produces its output earlier, the index table 306 is rotated to the right. In this fashion, the position of the workpiece 318 is controlled so that both magnetic-electric converting elements produce their outputs. As a result, the reference surface 305 is set in parallel with the X direction of the processing unit 304.

(iv) The position of the index table 306 at that time is detected and sent to the numerical control device which responsively adopts the position as the starting point of the processing program. If no positional correction against the workpiece is required, the equipment simply needs a single pair of cylinder and magnetic-electric converting element so as to use the skip signal as the original point signal in the Z direction. In this case, the processing unit need not be stopped, but can instantly commence its processing feeding.

(v) The cylinders 302 are moved back.

(vi) Predetermined processing operation is commenced.

Figure 18:
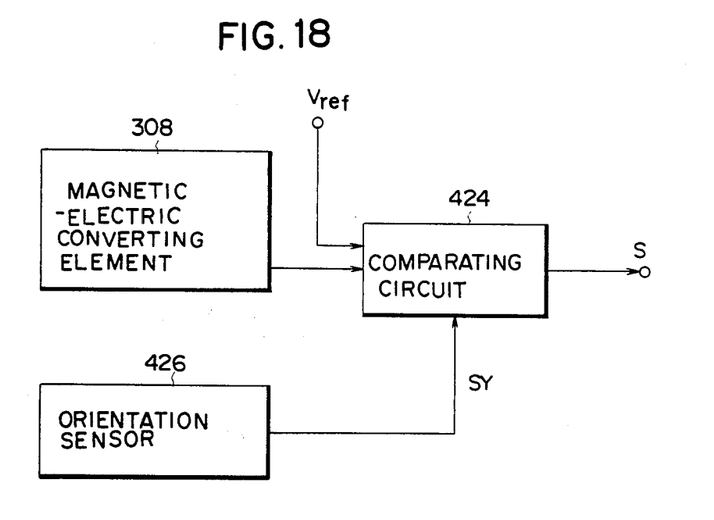
FIG. 18 is a detailed cross-sectional view of a specific arrangement of a sixth embodiment of the invention.

FIG. 18 illustrate a sixth embodiment of the invention which includes a magnet 425 (either a permanent magnet or an electromagnet) provided at the rear end of the spindle 307 and an orientation sensor 426 opposed to the magnet 425. The magnetic-electric converting elements, magnets, shield case, etc. used in the fifth embodiment should be involved in the sixth embodiment, but they are not illustrated in FIG. 18. Reference numerals 427 and 428 denote a belt and a pulley for driving the spindle 307, respectively, and reference numeral 429 designates a seal.

Figure 19:
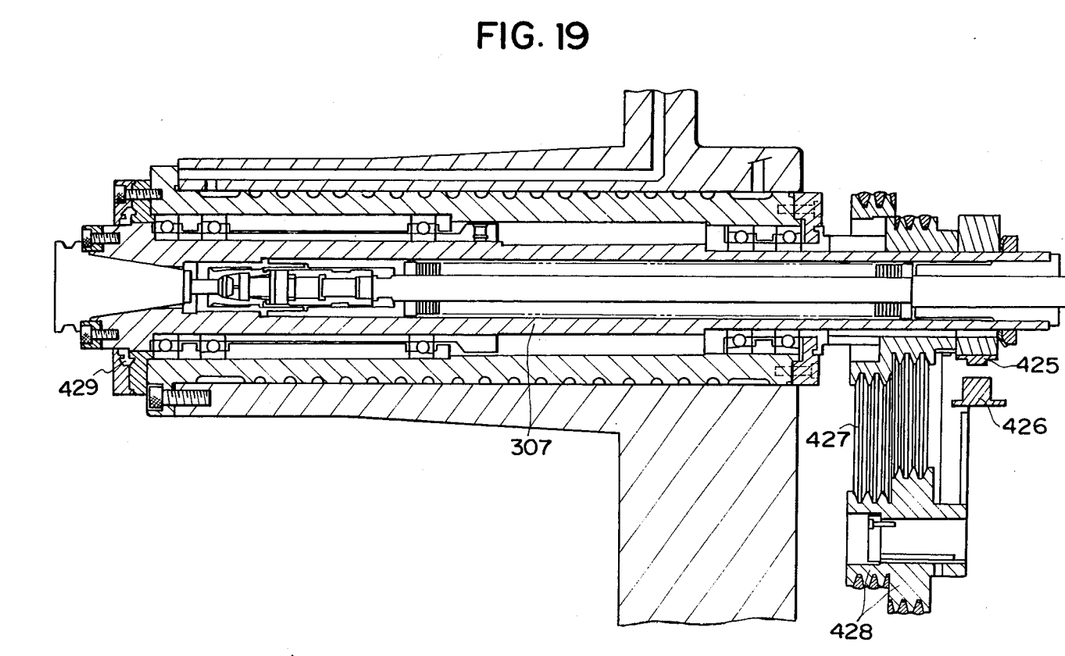
FIG. 19 is a block diagram of a detection output processing system in the sixth embodiment.

In the sixth embodiment, as shown in FIG. 19, an output of the orientation sensor 426 is used as a synchronous signal SY and applied to the comparator circuit 424 so that an output of each magnetic-electric converting element 308 is applied to the comparator circuit 424 in synchronization with the signal SY for comparison with the reference value Vref. When the output of the magnetic-electric converting element 308 reaches the reference signal Vref, the skip signal S is generated.

In the sixth embodiment, when the rotational angular position of the spindle 307 is detected upon alignment between the orientation sensor 426 and the magnet 425, the magnetic-electric converting element 30 is opposed to the magnet 410 (FIG. 14). Therefore, alignment of the element 308 and the magnet 410 occurs at 180 degrees interval, but detection is effected at 360 degrees interval (once a revolution). In this case, however, the use of the peak hold circuit described above enables twice detection per revolution.

Further, if the measurement function may be limited to the origin in the Z direction, the shield case may be omitted, and a single magnet suffices it. As a matter of course, two or more magnets are required when correction of the orientation is desired.

The invention arrangement provides the following unique effect.

Since the annular magnet is provided at the side of the spindle, and a positional relationship is established just near a workpiece, the equipment is seldom subject to a thermal influence of the feeding movement portion of the processing unit and the spindle. Therefore, high precision processing operation is ensured, and no spindle cooling means nor thermal correcting means is required.

Further, since the contactor and magnetic-electric converting elements are interposed between a workpiece and the spindle at the processing station so as to precisely control their positional relationship and provide a reference position of a feeding motion for a cutting operation, positioning errors or working errors caused by thermal deformation are eliminated, and no positioning means nor correction means is required in the transfer device. This results in a simplified arrangement of the equipment.

Particularly, since the annular magnet is mounted around and concentrically with the spindle and is always ready for alignment with the magnetic-electric converting element even during rotation of the spindle, no index means is required for indexing the rotational angle of the spindle. Additionally, the spindle may continue its feeding motion, and need not be stopped during detection. Further, since the numerical processing program is performed continuously by an output (skip signal) of the magnetic-electric converting element, the cycle time is reduced.

According to the second embodiment of the invention, the following effect is obtained. Since the position of the jig can be detected and corrected in three dimensional directions, the equipment maintains its high precision processing against all kinds of working operation. Additionally since the equipment simply requires a single contactor, its arrangement is very simple. Further, the time for detection (loss time during working operation) is very short, which results in an effective, qualified working operation, and no index means is required to index the rotational angle of the spindle. The invention is also effective when used in any usual numerical control processing equipment and not limited to the use in a transfer machine.

According to the third embodiment of the invention, the annular magnet is used to detect the positional relationship in the Z-axis direction between the contactor and the spindle, and the magnet is magnetically shielded except a necessary portion thereof. Therefore, no affection is applied to detection of positional relationships between the reference point and the contactor in the X-axis and Y-axis directions effected by the plate magnet and first and second magnetic-electric converting elements. As a result, the equipment does its best function under an improved accuracy. Therefore, when used in an originally high-ability flexible transfer machine, the invention ensures a high precision working operation.

According to the fourth embodiment of the invention, since the parallel degree of a workpiece in the transfer machine, etc. is established by a closed loop control against the jig or the index table, it is not necessary to establish the accuracy by the machine itself, but a high precision working operation is ensured by merely using a simple measuring means or adjusting means. Also, its efficiency is significantly increased.

According to the fifth and sixth embodiments of the invention, also when the spindle has a large diameter the original point in the Z direction can be measured by using one or more solid magnet pieces instead of an annular magnet. Therefore, fabrication of magnets is facilitated. Beside this, since detection is effected while the spindle continues its rotating, feeding motion, loss time is eliminated.

What is claimed is:

1. A high precision processing equipment comprising:
a contactor provided in a numerical control processing unit and having a magnetic-electric converting element at an intermediate lateral portion thereof;
means for moving said contactor back and forth;
a workpiece or its support member to which one end of said contactor in its advancing position contacts; and
an annular magnet fixed to a spindle of said processing unit and having magnetic poles aligned in the axial direction,
said magnetic-electric converting element being located at a position opposed to the movable range of said annular magnet during movement of said processing unit while said contactor takes its advanced position.

2. An equipment of claim 1 wherein said contactor is made from a friction-wearing material.

3. An equipment of claim 1 wherein said means for moving the contactor back and forth is a fluid cylinder.

4. An equipment of claim 1, wherein said magnet is fixed around said spindle, said equipment further comprising original position detecting means for detecting an output in the Z-axis direction when said magnet is opposed to said magnetic-electric converting element.

5. An equipment of claim 4 wherein said original position detecting means includes a sensor which detects opposed alignment between said magnet and said magnetic-electric converting element during rotation of the spindle and controls motion of the magnetic-electric converting element.

6. A high precision processing equipment comprising:
a non-magnetic contactor provided in a numerical control processing unit and having a contact portion and first and second magnetic-electric converting elements at one end thereof;
means for moving said contactor back and forth;
a reference member made from a non-magnetic material and having a reference surface to which said contact portion of the contactor in its advanced position contacts;
a support member forming a unitary body with said reference member to support a workpiece; and
magnets attached to said support member in an opposed relationship against said first and second magnetic-electric converting elements and having interpole boundaries rectangularly intersecting each other.

7. An equipment of claim 6 wherein said contactor and said reference member are made from a friction-wearing material.

8. An equipment of claim 6 further comprising means for enabling back and forth movement of said contactor while the contactor contacts said reference member, means for slightly moving back said processing unit while said contactor moving means is activated, and means for moving said processing unit toward respective interpole boundaries.

9. An equipment of claim 8 where said contactor moving means is a cylinder which can be stopped at any desired position.

10. An equipment of claim 6, wherein said magnets have magnetic poles aligned in the Z direction and fixed to said spindle, said contactor being provided with a third magnetic-electric converting element opposed to said magnets during processing feeding motion to effect positional detection in the X, Y and Z directions.

11. An equipment of claim 10 further comprising a magnetically shielding member secured to said spindle so as to encircle said magnets and having a window at a position to be opposed to said magnetic-electric converting elements.

12. An equipment of claim 6, wherein said magnets are four plate magnets which are fixed on a magnetized member, with their different poles abutting each other to form a flat configuration, said magnetized member being mounted on said workpiece support member.

13. An equipment of claim 12 wherein said reference member is located on said plate magnets or on said magnetized member.

14. A high precision processing equipment comprising:
- a processing unit rotatably supporting a spindle;
- at least two contactors provided in said processing unit and extending parallely with said spindle;
- means for moving said contactors back and forth;
- magnetic-electric converting elements attached to said contactors and opposed to said spindle;
- a magnet provided on said spindle so as to be opposed to the sides of the region of back and forth movement of said magnetic-electric converting elements and having magnetic poles aligned in the axial direction;
- a reference surface provided on a workpiece or its support member opposed to said processing unit to contact with said contactors in their advanced positions; and
- means for moving said support member toward a position for contact with said contactors.

* * * * *

UNITED STATES PATENT AND TRADEMARK OFFICE
CERTIFICATE OF CORRECTION

PATENT NO. : 4 784 541

DATED : November 15, 1988

INVENTOR(S) : Ryukichi TSUNO et al

It is certified that error appears in the above-identified patent and that said Letters Patent is hereby corrected as shown below:

On the first page of the patent document, change the title from "HIGH-PRECISION EQUIPMENT" to ---HIGH-PRECISION PROCESSING EQUIPMENT---.

Signed and Sealed this

Fourth Day of July, 1989

Attest:

DONALD J. QUIGG

Attesting Officer

Commissioner of Patents and Trademarks